Inventor
L.C. POCOCK - A.C. BEADLE
By Robert Harding Jr.
Attorney

Dec. 25, 1956 L. C. POCOCK ET AL 2,775,649

TELEPHONE SUBSCRIBER SETS

Filed April 14, 1952 2 Sheets-Sheet 2

Inventor
L.C. POCOCK - A. C. BEADLE

By Robert Harding Jr.
Attorney

United States Patent Office 2,775,649

Patented Dec. 25, 1956

2,775,649

TELEPHONE SUBSCRIBER SETS

Lyndall Crossthwaite Pocock and Anthony Crisp Beadle, London, England, assignors to International Standard Electric Corporation, New York, N. Y.

Application April 14, 1952, Serial No. 282,132

Claims priority, application Great Britain April 18, 1951

11 Claims. (Cl. 179—81)

Figure 1:
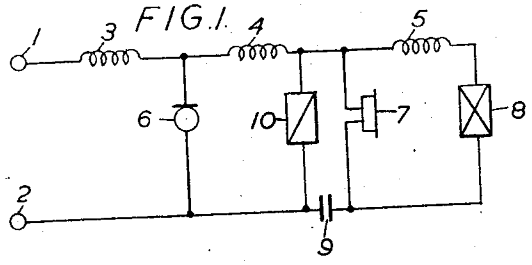

This invention relates to telephone substation circuits.

According to the invention there is provided a telephone substation circuit comprising non-linear resistance means connected in the circuit so that the resistance of the said non-linear resistance means varies under control of the unidirectional energising voltage applied to the transmitter and so that the said non-linear resistance means provides a variable shunt across the transmitter and the receiver which falls in resistance when the said voltage rises and rises in resistance when the said voltage falls.

According to the invention there is further provided a telephone substation circuit with variable shunt means for the transmitter and the receiver comprising a non-linear resistance element or elements and means under control of the unidirectional line current for reducing the resistance of the said element or elements when the said current rises and for increasing the resistance of the said element or elements when the said current falls.

According to the invention there is further provided a telephone substation circuit comprising two input terminals, a receiver, a transmitter, a line balancing network, an induction coil having a first, a second and a third winding, four rectifiers arranged as a full wave bridge rectifier, a bridge network consisting of four non-linear resistance elements and a transformer having a first winding and a second winding, the circuit being connected up so that the transmitter in series with the first winding of the coil is connected across the said input terminals, that the receiver, the condenser and the second winding of the said coil, connected in series in any order, are connected in parallel with the transmitter, that the line balancing network and the third winding of the said coil in series are connected in parallel with the receiver, that the alternating current input points of the said full wave bridge rectifier are connected to the terminals of the transmitter, that the direct current output points of the said bridge rectifier are connected to two first diagonally opposite points of the said bridge network, that two second diagonally opposite and equipotential points of the said bridge network are connected to the first winding of the said transformer, that the second winding of the said transformer is connected to the terminals of the receiver, that the said network is so arranged that the shunt resistance, presented thereby to the said transformer, diminishes when the voltage applied to the said bridge network from the said bridge rectifier increases and the said shunt resistance increases when the said voltage falls and that the said bridge rectifier and bridge network are so arranged that the shunt resistance presented to the transmitter diminishes when the unidirectional energising voltage applied to the transmitter via the said input terminals rises and that the said shunt resistance applied to the transmitter rises when the said energising voltage falls.

According to the invention there is further provided a telephone substation circuit comprising two input terminals, a receiver, a transmitter, a line balancing network, an induction coil having a first, a second and a third winding, four rectifiers arranged as a full wave bridge rectifier and a bridge network consisting of four non-linear resistance elements the circuit being connected up so that the transmitter in series with the first winding of the said coil is connected across the said input terminals, that the said balancing network, the condenser and the second winding of the said coil, connected in series in any order are connected in parallel with the transmitter, that the receiver and the third winding of the said coil are connected in parallel but are not connected to the remainder of the circuit save by inductive coupling between the windings of the said coil and save as hereinafter stated, that the alternating current input points of the said full wave bridge rectifier are connected to the terminals of the transmitter, that the direct current output points of the said bridge rectifier are connected to two first diagonally opposite points of the said bridge network, that two second diagonally opposite and equipotential points of the said bridge network are connected to the terminals of the receiver, that the said network is arranged so that the shunt resistance presented thereby to the receiver diminishes when the voltage applied to the said bridge network from the said bridge rectifier increases and the said shunt resistance increases when the said voltage falls, and that the said bridge rectifier and bridge network are arranged so that the shunt resistance presented to the transmitter diminishes when the unidirectional energising voltage applied to the transmitter via the said input terminals rises and so that the said shunt resistance applied to the transmitter rises when the said energising voltage falls.

According to the invention there is further provided a telephone substation circuit comprising two input terminals, a receiver, a transmitter, a line balancing network, a codenser, an induction coil having a first winding, a second winding and a third winding, and a non-linear impedance element of the type of which the impedance diminishes when the voltage applied to it is raised and of which the impedance rises when the said voltage falls, the circuit being connected up in such a way that the transmitter and the first winding of the coil in series are connected across the input terminals, that the second winding of the coil and the non-linear impedance element in series with one another are connected in parallel with the transmitter, that the receiver and the condenser in series with one another are connected in parallel with the non-linear impedance element and that the third winding of the coil and the line balancing network in series with one another are connected in parallel with the receiver.

According to the invention there is further provided a telephone substation circuit comprising two input terminals, a receiver, a transmitter, a line balancing network, a first condenser, a second condenser, an induction coil having a first winding, a second winding and a third winding and a nonlinear impedance element of the type of which the impedance diminishes when the voltage applied to it increases and of which the impedance rises when the said voltage falls, the circuit being so connected up that the transmitter and the first winding of the coil are connected in series with one another across the input terminals that the line balancing network, the first condenser and the second condenser are connected in series in any order and together in series with the second winding of the coil and that the whole series combination of line balancing network, first condenser, second condenser and second winding of the coil being connected in parallel with the transmitter and that the receiver and the third winding of the coil in series are connected in parallel with the series combination of the line balancing network and the second condenser so that one terminal of the receiver is directly connected to one terminal of the first condenser and that the non-linear impedance element is connected in parallel with the series combination of the receiver and the first condenser.

An obstacle to the introduction of more sensitive transmitters and receivers in telephone substation instruments has hitherto been the tendency to excessive transmitted speech level and excessive side tone, leading in extreme cases to howling, when an instrument intended for general use in a system with a wide variety of subscribers' line impedances has been connected to a short line, or to a line for any other reason varying substantially in impedance from the chosen line impedance with which the instrument is designed to have its highest efficiency.

In British Patents Nos. 655,774 and 671,784, it was proposed to provide a shunt circuit for the transmitter comprising a non-linear element the resistance of which was variable under control of the unidirectional energising voltage across the transmitter so as to oppose changes in that voltage.

It is now proposed to add a similar impedance similarly varied, in shunt with the receiver, using for the purpose the whole or a part of the same shunt circuit as is used for the transmitter according to the two patents above mentioned.

Certain embodiments of the invention will now be described in relation to the accompanying drawings in which Figs. 1, 2, 3, 4, 5, 6 and 7, each show the circuit diagram of a different embodiment.

These circuit diagrams show only the essential elements of the circuit and omit such things as dial contact springs, cradle switch contacts, bell coils etc. but these items and their method of connection are well known in the art and are not affected by the invention.

In these figures corresponding items are given the same reference numerals throughout.

Fig. 1 shows a well known telephone substation circuit of the anti-side-tone type. There are two line terminals 1 and 2. An induction coil with three windings 3, 4 and 5 connected in series, is connected at the free end of winding 3, to terminal 1.

The three other principal circuit elements are a transmitter 6, a receiver 7 and an anti-side-tone balance network 8, and are connected, together and to terminal 2 by one terminal of each of them but the interconnection between terminal 2 and transmitter 6, on the one hand, and receiver 7, and network 8 on the other hand, is made through a condenser 9, inserted to isolate receiver 7 and network 8 from the D. C. transmitter energising voltage received at the substation terminals 1 and 2 over the exchange line.

By their other terminals, each of these elements 6, 7 and 8 is connected to the induction coil, in the case of 6, to the junction of windings 3 and 4, in the case of 7 to the junction of windings 4 and 5 and in the case of 8, to the free end of 5.

This is a well known circuit as it has been described so far.

The modification proposed is to connect a non-linear impedance element 10 between the junction of windings 4, 5 and receiver 7 on the one hand, and the junction of terminal 2, transmitter 6 and condenser 9 on the other hand.

The element 10 may be a thermistor, metal rectifier, or silicon carbide element and has a negative characteristic of resistance against applied voltage. When the transmitter voltage rises, as when the substation is connected to the exchange by a short line having a negligible line loss, for instance, this voltage appears across element 10 via winding 4 of the coil (which will or can be chosen to have a relatively low direct current resistance) and the resistance of element 10 falls causing an increased line current and consequently an increased voltage drop in the exchange feed coils, the line and any other series components. The voltage across the transmitter is thus prevented from rising as much as it would in the absence of element 10 and by careful choice of element 10 the transmitter voltage can be kept constant within limits of a few volts under normal conditions.

A transmitter in a substation connected to the exchange by a short line will tend to transmit to the other end at an increased level due to reduced line losses, even if the energising voltage is held constant, but this generally can be tolerated.

Serious trouble is encountered however if, in addition to reduced line losses, the output at the transmitter terminals is substantially increased due to a rise in the energising voltage.

These disadvantages come under three main headings:

1. Excessive received level at the other end of a connection.

2. Excessive cross-talk due to excessive speech levels in lines and circuits connected to the substation.

3. Excessive side-tone, particularly when listening, due to room noise picked up by the transmitter and passed to the receiver by reason of imperfect side-tone balance. (Side-tone balance is likely to be poor in any event on short lines with a standardised instrument designed for maximum efficiency on long lines.)

4. Howling due to the factors mentioned in "3" above with the addition of the acoustic path from receiver to transmitter when the handset is held clear of the head, which completes a singing loop.

These factors have for some time prevented the use of transmitters and receivers which would give maximum efficiency on medium and long lines but recent advances in the design of transmitters and receivers have aggravated them considerably and are now a major obstacle to the use of these new transmitters and receivers in public systems.

It is a considerable contribution to the solution of the problem if the transmitter energising voltage can be prevented from rising appreciably on short lines but if the receiver can be degraded at the same time a further improvement is obtained.

As the resistance of element 10 falls as a result of the application of an increased transmitter voltage, the receiver 7 is shunted, so far as alternating speech currents are concerned by a reduced resistance. It is desirable to ensure that a condenser is inserted in the shunt path across the receiver to keep the direct current transmitter voltage from the receiver. In this case the existing condenser 9, inserted for the same purpose, continues to fulfil its function.

Figure 2:
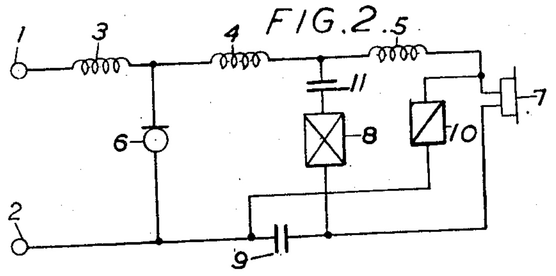

Fig. 2 shows another popular anti-side-tone circuit which, differs from the Fig. 1 circuit only in the transposition of receiver 7 and network 8 and certain consequential re-adjustments to the ratios of the coil windings, if the non-linear element 10 is removed from both circuits.

Here the shunt path across the transmitter 6 passes through two windings 4 and 5 of the coil in series with element 10 and whilst condenser 9 still cuts the principal direct current path through receiver 7 and network 8, there remains a path from terminal 2 through element 10, receiver 7, network 8, coils 4 and 3 (in that order) to terminal 1 and it is advisable to break this path by inserting an additional condenser 11 preferably in one of the connections to 8.

The behaviour of the circuit of Fig. 2 is similar to that of Fig. 1, but the inclusion of two windings of the coil in series with the transmitter shunt calls for careful coil design to avoid excessive dilution of the control effect exerted by element 10.

Figure 3:
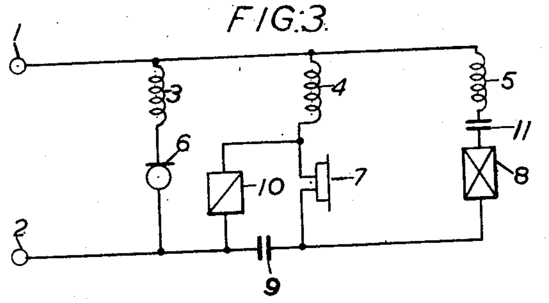

Fig. 3 shows another well known anti-side tone circuit to which the non-linear shunt has been added. This embodiment closely resembles that shown in Fig. 1 except for the parallel arrangement of the coil windings 3, 4 and 5, and the need for the insertion of condenser 11 to block a direct current path from terminal 2 through element 10, receiver 7, network 8 and coil 5 to terminal 1.

Figure 4:
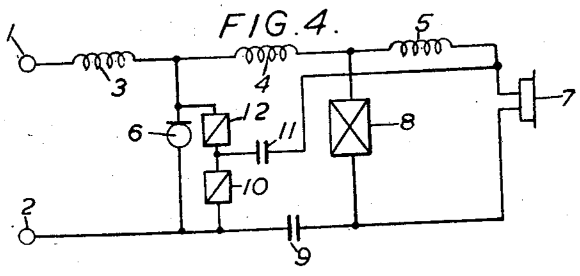

Fig. 4 shows an embodiment using the same basic circuit as that of Fig. 2 but the arrangement of the non-linear shunt is different.

Two non-linear elements 10 and 12 are connected in series across the transmitter and the junction between them is taken to one side of the receiver through a condenser 11 to block the direct current path from terminal 2 via element 10, receiver 7, network 8, coils 4 and 3 to terminal 1.

The non-linear element 10 behaves in the same way as in the previously described embodiments, and applies a shunt to both transmitter and receiver under low resistance line conditions.

The element 12 which forms part of the transmitter shunt may be a similar non-linear element to 10 or different types of elements could be used, for instance one could be a thermistor and the other a dry rectifier or silicon carbide element.

The element 12 could be a linear resistor but as this would "dilute" the action of element 10 so far as the transmitter is concerned it will generally not be advantageous to use such an arrangement.

In this embodiment, alternating currents will be fed into the receiver circuit from the transmitter alternating currents passing through 10. As these currents vary according to line conditions, there will be some change of the side-tone which will vary according to line conditions. By careful design this can be arranged to counteract the out-of-balance side-tone currents in the receiver under conditions where the balance network does not match the line impedance.

Figure 5:
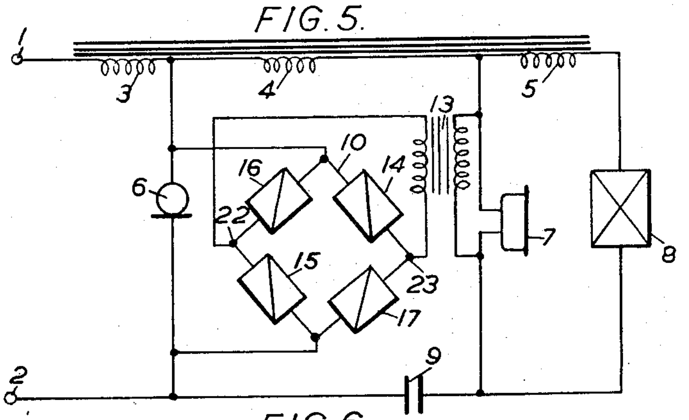
Figure 6:
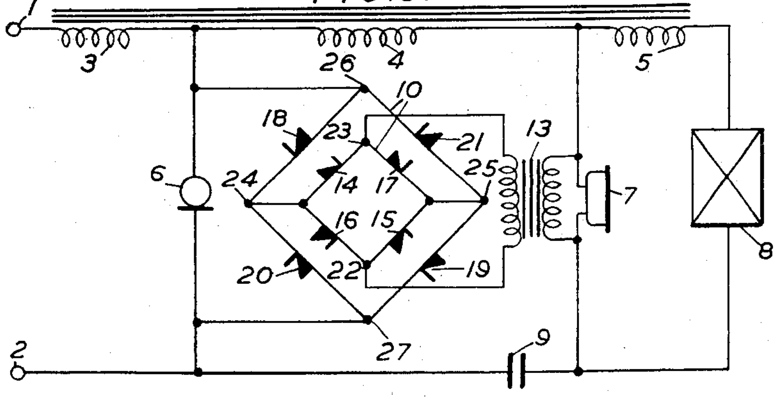
Figure 7:
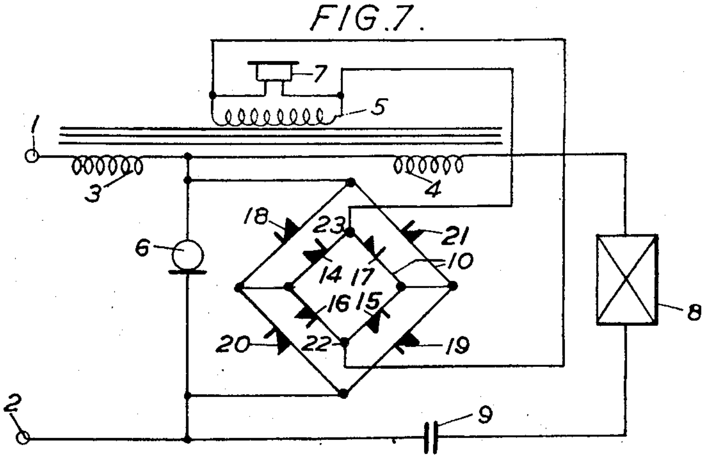

If, however, it is required to avoid any speech currents being applied to the receiver in this way the arrangements of Figures 5, 6 and 7 which are elaborations of the arrangement of Fig. 4, may be used.

Fig. 5 has the same basic circuit as Fig. 1, but the arrangement of the shunt circuits could equally well be applied to the basic circuits of Figs. 2, 3 and 4.

In this arrangement, four non-linear elements, 14, 15, 16 and 17, denoted collectively by reference numeral 10, are arranged as a bridge, from the equipotential points of which (22 and 23) connections are taken to one winding of a transformer 13, whose other winding shunts the receiver.

When the voltage across the transmitter rises, the resistance of the elements 14, 15, 16 and 17 falls. When the voltage across the transmitter 6 is low, no voltage, A. C. or D. C. is applied to 13 as the points 22 and 23 are equipotential points of the bridge, but elements 16, 14 and 15, 17, in parallel form a shunt, of lowered resistance as the transmitter energising voltage rises, which is applied to the receiver through transformer 13. The impedance of the primary winding 13*a* is lowered when the net effective resistance across secondary 13*b* is lowered. As the impedance of primary 13*a* decreases, more alternating current signal voltage will pass through said primary thereby effectively decreasing the current passing through receiver 7.

Transformer 13, which can be replaced by condensers in each connection to the receiver, is necessary to prevent short circuiting various parts of 10.

The circuit in this form has certain disadvantages, for instance:

(*a*) The elements 16 and 15 are in parallel with the elements 14 and 17 and each must be doubled in resistance value to obtain a given effective shunt resistance across the transmitter, as compared with the arrangement of Fig. 4, and, as compared with the single element arrangements of Figs. 1, 2 and 3, four times as many elements are required.

(*b*) If directional elements, such as rectifiers, are used they must all be poled in the same direction leading from one terminal of the transmitter to the other, if they are to form a balanced bridge, and if there is any risk of a polarity reversal of the voltage received over the exchange line, each element must have two rectifiers in parallel and oppositely poled, if the shunt is to operate on a polarity reversal of the exchange line voltage.

Fig. 6 shows an arrangement which overcomes this difficulty.

The bridge 14, 15, 16, 17 (shown rotated through 90°), is connected across the diagonals of a rectifier network of the type used as a full wave rectifier and consisting of elements 18, 19, 20 and 21, all poled in the direction from right to left of the network.

The horizontal points 24 and 25 always have the same polarity whatever the polarity of the vertical points 26 and 27 and the voltage across points 24, 25 varies according to the voltage across points 26 and 27, irrespective of the polarity of the latter.

The voltage across points 26, 27 which is the voltage across the transmitter, when it rises, lowers the resistance of the rectifiers which are in the conducting direction, in the path between the two points. If point 26 is positive this path is through rectifier 18, from point 24 to point 25 through rectifiers 14, 17 and 16, 15 in parallel and through rectifier 19 to point 27. If point 27 is positive, the path is through rectifier 20, from point 24 to point 25 as before and through 21, to 26.

Points 22 and 23 are equipotential points for A. C. and D. C. under all conditions and as the rectifiers 14, 15, 16 and 17 are biassed to conduction, they provide a shunt path across transformer 13 which varies in resistance according to the voltage applied across points 26 and 27.

The arrangement of Fig. 6 also, could be applied to anti-side-tone circuits of the types used in the arrangements shown in Figs. 2, 3 and 4.

Fig. 7 shows a similar arrangement applied to an anti-side-tone circuit of the type where the receiver is connected to a separate winding, 5, of the induction coil. This enables the transformer 13 to be dispensed with.

The invention has been described in relation to substation circuits of the anti-side-tone type but it could, of course be used with side tone circuits.

While the principles of the invention have been described above in connection with specific embodiments, and particular modifications thereof, it is to be clearly understood that this description is made only by way of example and not as a limitation on the scope of the invention.

What we claims is:

1. A telephone substation circuit comprising a source of unidirectional line current, a transmitter and a receiver, a line coupled to said current source, coupling means for coupling said transmitter and said receiver to said line, a shunt circuit for controlling the unidirectional current passing through said transmitter and the pulsating speech currents passing through said receiver, said shunt circuit comprising non-linear resistance bridge means having a first pair of diagonal points in shunt with said transmitter, said shunt circuit including inductive means in shunt with said receiver, means coupling said inductive means with the opposite diagonal points of said bridge means for altering the impedance of said inductive means in accordance with the value of the voltage across said first diagonal points.

2. A telephone substation circuit as claimed in claim 1, further comprising an anti-sidetone balance network, said network inductively coupled to said receiver and adapted to apply side tone currents thereto in opposition to the pulsating speech currents derived from said transmitter.

3. A telephone substation circuit as claimed in claim 1, wherein said shunt circuit includes means for electrically isolating said receiver from currents appearing across the opposite diagonal points of said bridge means.

4. A telephone substation circuit as claimed in claim 1 wherein said bridge means comprises a plurality of dry rectifiers arranged as a full wave rectifier bridge.

5. A telephone substation circuit as claimed in claim 1 in which the said bridge means comprises two non-linear resistance elements in series only one of which shunts the receiver.

6. A telephone substation circuit as claimed in claim 1, wherein said inductive means comprises a transformer having one winding thereof connected in shunt with said receiver and its other winding connected to the opposite diagonal points of said bridge means.

7. A telephone substation circuit as claimed in claim 1, wherein said non-linear resistance bridge means comprises a pair of full wave rectifier bridges, one of said bridges poled opposite to the other, the first bridge having its first pair of diagonal points in shunt with said transmitter and its opposite diagonal points connected to a first pair of diagonal points of said second bridge, the opposite diagonal points of said second bridge coupled to said inductive means.

8. A telephone substation circuit as claimed in claim 7, wherein said inductive means comprises a transformer having a pair of windings, one of said windings connected in shunt with said receiver and the other of said windings connected to the opposite diagonal points of said second rectifier bridge.

9. A telephone substation circuit as claimed in claim 7, wherein said inductive means comprises a transformer winding in inductive relation with said line, said winding in shunt with both said receiver and the opposite diagonal points of said second rectifier bridge.

10. A telephone substation circuit comprising two input terminals, a receiver, a transmitter, a line balancing network, an induction coil having a first, a second and third winding, four rectifiers arranged as a full wave bridge rectifier, a bridge network consisting of four non-linear resistance elements and a transformer having a first winding and a second winding, the circuit being connected up so that the transmitter in series with the first winding of the coil is connected across the said input terminals, that the receiver, the condenser and the second winding of the said coil, connected in series in any order, are connected in parallel with the transmitter, that the line balancing network and the third winding of the said coil in series are connected in parallel with the receiver, that the alternating current input points of the said full wave bridge rectifier are connected to the terminals of the transmitter, that the direct current output points of the said bridge rectifier are connected to two first diagonally opposite points of the said bridge network, that two second diagonally opposite and equipotential points of the said bridge network are connected to the first winding of the said transformer, that the second winding of the said transformer is connected to the terminals of the receiver, that the said network is so arranged that the shunt resistance, presented thereby to the said transformer, diminishes when the voltage applied to the said bridge network from the said bridge rectifier increases and the said shunt resistance increases when the said voltage falls and that the said bridge rectifier and bridge network are so arranged that the shunt resistance presented to the transmitter diminishes when the unidirectional energising voltage applied to the transmitter via the said input terminals rises and that the said shunt resistance applied to the transmitter rises when the said energising voltage falls.

11. A telephone substation circuit comprising two input terminals, a receiver, a transmitter, a line balancing network, an induction coil having a first, a second and a third winding, four rectifiers arranged as a full wave bridge rectifier and a bridge network consisting of four non-linear resistance elements the circuit being connected up so that the transmitter in series with the first winding of the said coil is connected across the said input terminals, that the said balancing network, the condenser and the second winding of the said coil, connected in series in any order are connected in parallel with the transmitter, that the receiver and the third winding of the said coil are connected in parallel but are not connected to the remainder of the circuit save by inductive coupling between the windings of the said coil and save as hereinafter stated, that the alternating current input points of the said full wave bridge rectifier are connected to the terminals of the transmitter, that the direct current output points of the said bridge rectifier are connected to two first diagonally opposite points of the said bridge network, that two second diagonally opposite and equipotential points of the said bridge network are connected to the terminals of the receiver, that the said network is arranged so that the shunt resistance presented thereby to the receiver diminishes when the voltage applied to the said bridge network from the said bridge rectifier increases and the said shunt resistance increases when the said voltage falls, and that the said bridge rectifier and bridge network are arranged so that the shunt resistance presented to the transmitter diminishes when the unidirectional energising voltage applied to the transmitter via the said input terminal rises and so that the said shunt resistance applied to the transmitter rises when the said energising voltage falls.

References Cited in the file of this patent

UNITED STATES PATENTS

| | | |
|---|---|---|
| 2,287,998 | Johnson | June 30, 1942 |
| 2,288,049 | Tillman | June 30, 1942 |
| 2,387,269 | Johnson | Oct. 23, 1945 |
| 2,604,543 | Goodale | July 22, 1952 |